(12) United States Patent
Eyal et al.

(10) Patent No.: US 10,598,969 B2
(45) Date of Patent: Mar. 24, 2020

(54) COUPLING SENSOR INFORMATION TO AN OPTICAL CABLE USING ULTRASONIC VIBRATIONS

(71) Applicant: TECHNOLOGY INNOVATION MOMENTUM FUND (ISRAEL) LIMITED PARTNERSHIP, Tel Aviv (IL)

(72) Inventors: Avishay Eyal, Givat Shmuel (IL); Shaul Ozeri, Tel Aviv (IL)

(73) Assignee: Technology Innovation Momentum Fund (Israel) Limited Partnership, Tel Aviv (IL)

( * ) Notice: Subject to any disclaimer, the term of this patent is extended or adjusted under 35 U.S.C. 154(b) by 0 days.

(21) Appl. No.: 16/311,178

(22) PCT Filed: Jun. 27, 2017

(86) PCT No.: PCT/IB2017/053833
§ 371 (c)(1),
(2) Date: Dec. 19, 2018

(87) PCT Pub. No.: WO2018/011656
PCT Pub. Date: Jan. 18, 2018

(65) Prior Publication Data
US 2019/0331942 A1 Oct. 31, 2019

Related U.S. Application Data

(60) Provisional application No. 62/361,556, filed on Jul. 13, 2016.

(51) Int. Cl.
*G02F 1/125* (2006.01)

(52) U.S. Cl.
CPC ..................... *G02F 1/125* (2013.01)

(58) Field of Classification Search
CPC ............................. G02F 1/0134; G02F 1/125
See application file for complete search history.

(56) References Cited

U.S. PATENT DOCUMENTS

| | | |
|---|---|---|
| 3,645,603 A | 2/1972 | Smith |
| 4,086,484 A | 4/1978 | Steensma |
| (Continued) | | |

FOREIGN PATENT DOCUMENTS

| | | |
|---|---|---|
| EP | 0178045 A1 | 4/1986 |
| GB | 2492068 A | 12/2012 |
| (Continued) | | |

OTHER PUBLICATIONS

Tadesse et al., "Sub-optical wavelength acoustic wave modulation of integrated photonic resonators at microwave frequencies", Nature Communications, pp. 1-7, Nov. 17, 2014.

(Continued)

*Primary Examiner* — Omar R Rojas
(74) *Attorney, Agent, or Firm* — Kligler & Associates Patent Attorneys Ltd

(57) ABSTRACT

An apparatus (32) includes an electronic circuit (76, 80, 84), an electro-acoustic transducer (60) and a coupler (64). The electronic circuit is configured to receive data to be transmitted over an optical cable (24), and to convert the data into a modulating signal. The electro-acoustic transducer is configured to convert the modulating signal into an acoustic wave. The coupler is mechanically coupled to a section of the optical cable, and is configured to apply to the section a longitudinal strain that varies responsively to the acoustic wave, so as to modulate the data onto an optical carrier traversing the optical cable.

19 Claims, 3 Drawing Sheets

(56) References Cited

U.S. PATENT DOCUMENTS

| | | | |
|---|---|---|---|
| 4,468,091 | A | 8/1984 | Schmadel et al. |
| 6,418,255 | B1 | 7/2002 | Maier |
| 7,580,184 | B2 * | 8/2009 | Shu .................. G02B 6/02195 359/337.5 |
| 7,697,795 | B2 | 4/2010 | Heatley et al. |
| 8,687,927 | B2 * | 4/2014 | Grosso .................. G01V 1/186 385/13 |
| 9,036,951 | B2 | 5/2015 | Bhave et al. |
| 9,436,061 | B2 | 9/2016 | Nakamura et al. |
| 2007/0116408 | A1 | 5/2007 | Eberle et al. |
| 2007/0264012 | A1 | 11/2007 | Heatley et al. |
| 2008/0166120 | A1 | 7/2008 | Heatley et al. |
| 2008/0219093 | A1 | 9/2008 | Heatley et al. |

FOREIGN PATENT DOCUMENTS

| | | |
|---|---|---|
| WO | 0028352 A2 | 5/2000 |
| WO | 2017099740 A1 | 6/2017 |

OTHER PUBLICATIONS

Ulbricht et al., "Elucidating gigahertz acoustic modulation of extraordinary optical transmission through a two-dimensional array of nano-holes", Applied Physics Letters, vol. 110, pp. 091910-091910-5, Mar. 2, 2017.

International Application PCT/IB2017/053833 Search Report dated Oct. 3, 2017.

* cited by examiner

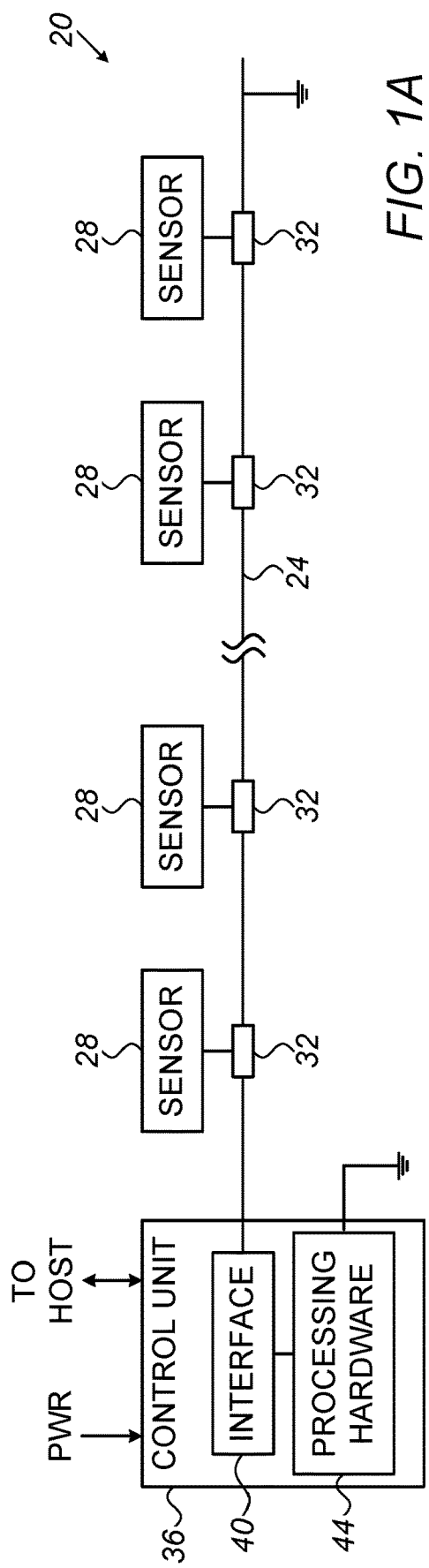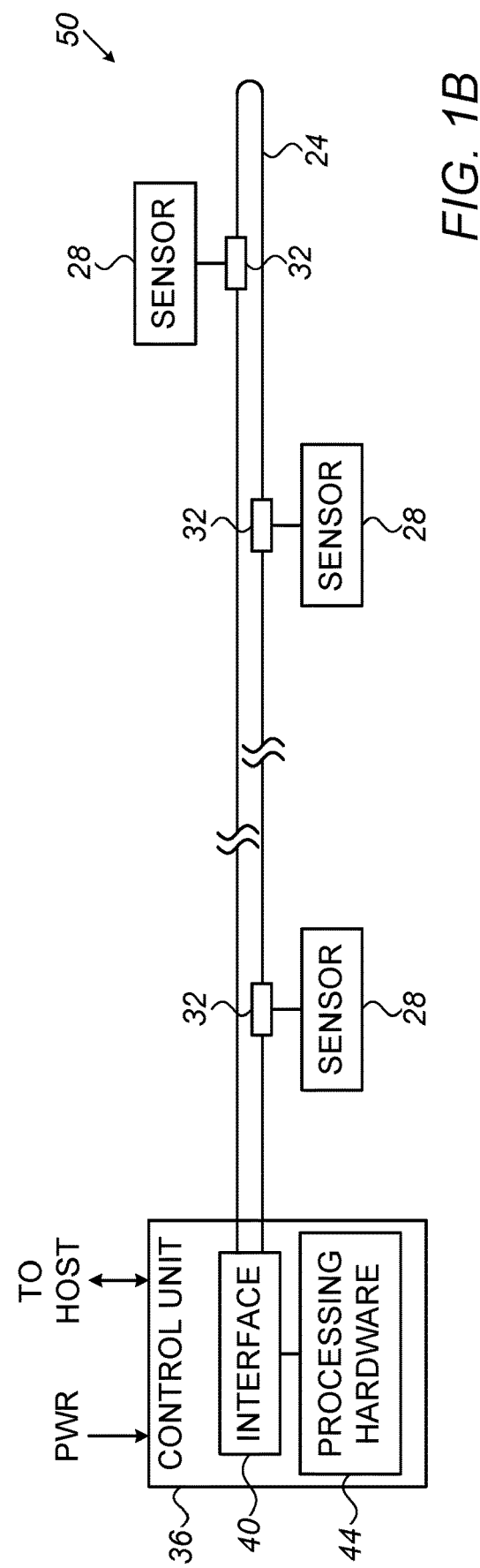

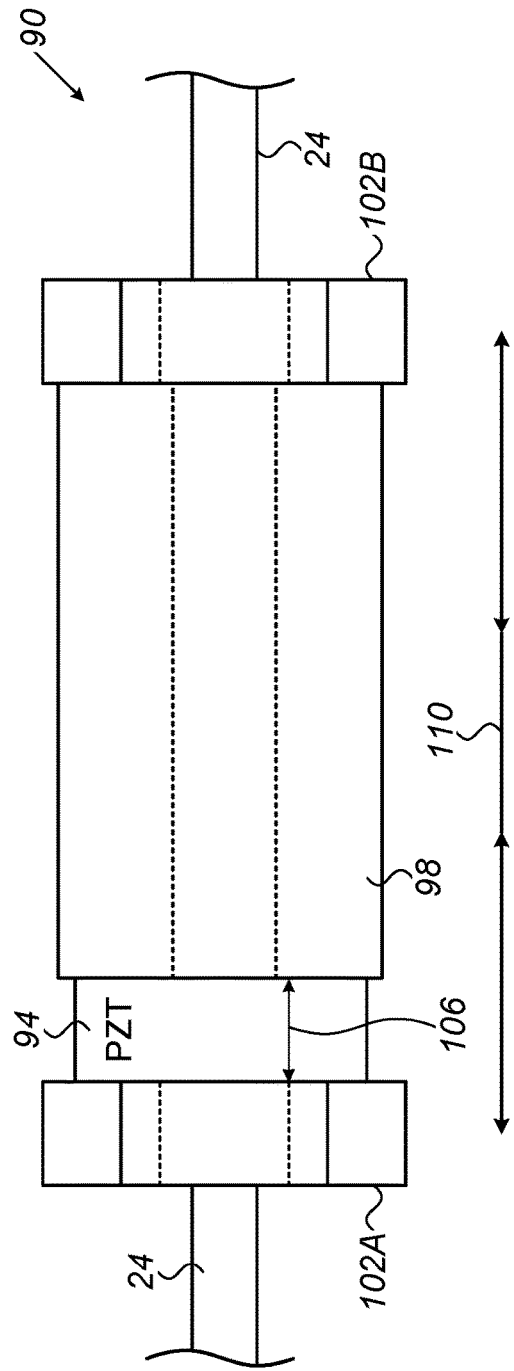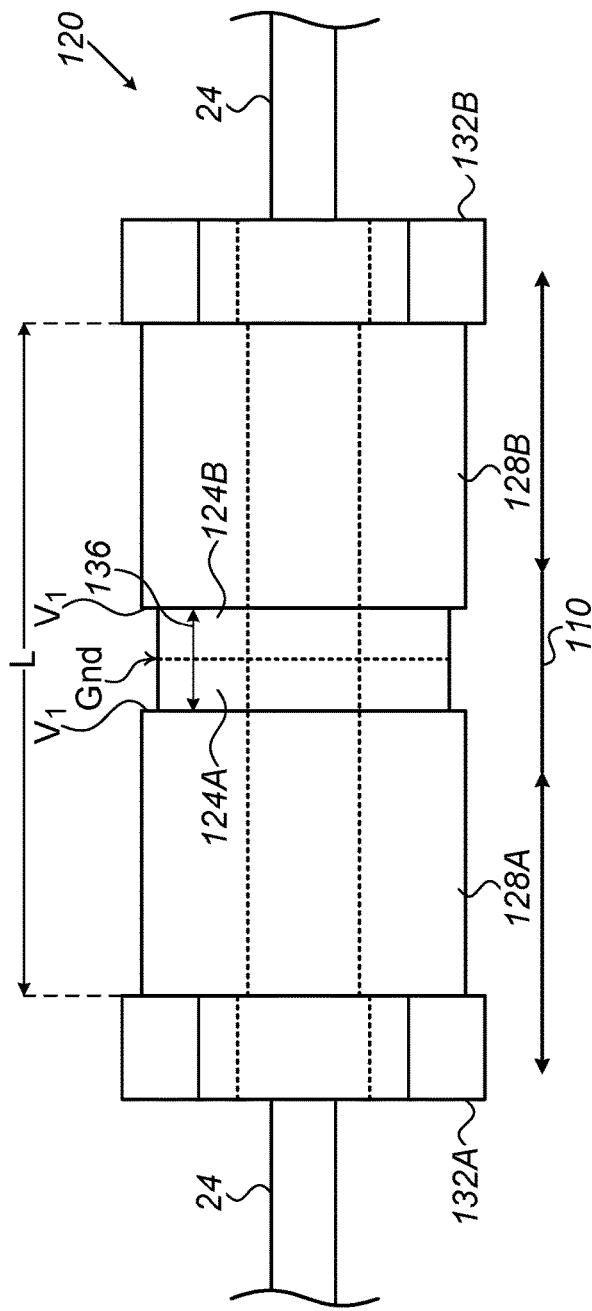
FIG. 3
FIG. 4

COUPLING SENSOR INFORMATION TO AN OPTICAL CABLE USING ULTRASONIC VIBRATIONS

CROSS-REFERENCE TO RELATED APPLICATIONS

This application is U.S. National Phase of PCT Application PCT/IB2017/053833, filed Jun. 27, 2017, which claims the benefit of U.S. Provisional Patent Application 62/361,556, filed Jul. 13, 2016. The disclosures of these related applications are incorporated herein by reference.

FIELD OF THE INVENTION

The present invention relates generally to sensor networks, and particularly to methods and systems for coupling sensor information to an optical cable using ultrasonic vibrations.

BACKGROUND OF THE INVENTION

Various techniques are known in the art for transforming a section of an optical fiber into an optical modulator while keeping the fiber itself intact. For example, U.S. Patent Application Publication 2008/0166120 describes a modulator arrangement for acoustically modulating optical radiation. The modulator arrangement has a waveguide portion formed from a flexible material, a vibrator element for generating acoustic vibrations, and a coupling arrangement for releasably coupling the vibrating element to the waveguide portion. The coupling arrangement include a first coupling member secured to the waveguide portion, and a second coupling member secured to the vibrator element.

SUMMARY OF THE INVENTION

An embodiment of the present invention that is described herein provides an apparatus including an electronic circuit, an electro-acoustic transducer and a coupler. The electronic circuit is configured to receive data to be transmitted over an optical cable, and to convert the data into a modulating signal. The electro-acoustic transducer is configured to convert the modulating signal into an acoustic wave. The coupler is mechanically coupled to a section of the optical cable, and is configured to apply to the section a longitudinal strain that varies responsively to the acoustic wave, so as to modulate the data onto an optical carrier traversing the optical cable.

In some embodiments, the coupler includes first and second brackets that are fixed to respective ends of the section of the optical cable, and the electro-acoustic transducer is configured to couple the acoustic wave to the brackets, so as to modulate a length of the section. In an embodiment, the coupler further includes one or more cylinders that are fitted between the electro-acoustic transducer and the brackets, for coupling the acoustic wave from the electro-acoustic transducer to the brackets. In a disclosed embodiment, the electro-acoustic transducer includes first and second transducer elements stacked back-to-back.

In some embodiments, the electronic circuit is configured to generate the modulating signal by modulating the data onto a carrier, whose carrier frequency matches a resonance frequency of the electro-acoustic transducer. In an example embodiment, the electronic circuit is configured to adaptively adjust the carrier frequency to match the resonance frequency.

In some embodiments, the apparatus further includes power harvesting circuitry, which is configured to inductively harvest electrical power from an electrical conductor that is part of the optical cable and carries an Alternating-Current (AC) power signal, and to provide the electrical power to the electronic circuit. In some embodiments, the electronic circuit is configured to inductively receive a signal from an electrical conductor that is part of the optical cable, and to extract information from the received signal.

In some embodiments, the coupler is configured to be coupled only to an exterior of the optical cable without penetrating the optical cable. In some embodiments, the coupler is configured to be detachable from the optical cable.

There is additionally provided, in accordance with an embodiment of the present invention, a system including a control unit and one or more coupling devices. The control unit is configured to transmit an optical carrier over an optical cable, to receive a modulated version of the optical carrier from the optical cable, and to extract data from the modulated version. Each of the coupling devices includes an electronic circuit, an electro-acoustic transducer and a coupler. The electronic circuit is configured to receive data to be transmitted to the control unit over the optical cable, and to convert the data into a modulating signal. The electro-acoustic transducer is configured to convert the modulating signal into an acoustic wave. The coupler is mechanically coupled to a section of the optical cable, and is configured to apply to the section a longitudinal strain that varies responsively to the acoustic wave, so as to modulate the data onto the optical carrier traversing the optical cable.

There is further provided, in accordance with an embodiment of the present invention, a method including receiving data to be transmitted over an optical cable, and converting the data into a modulating signal. The modulating signal is converted into an acoustic wave using an electro-acoustic transducer. A longitudinal strain, which varies responsively to the acoustic wave, is applied to a section of the optical cable using a coupler that is mechanically coupled to the section, so as to modulate the data onto an optical carrier traversing the optical cable.

The present invention will be more fully understood from the following detailed description of the embodiments thereof, taken together with the drawings in which:

BRIEF DESCRIPTION OF THE DRAWINGS

FIGS. 1A and 1B are block diagrams that schematically illustrate sensor systems, in accordance with embodiments of the present invention;

FIGS. 3 and 4 are schematic side views of couplers and respective electro-acoustic transducers, in accordance with embodiments of the present invention.

DETAILED DESCRIPTION OF EMBODIMENTS

Overview

Figure 2:
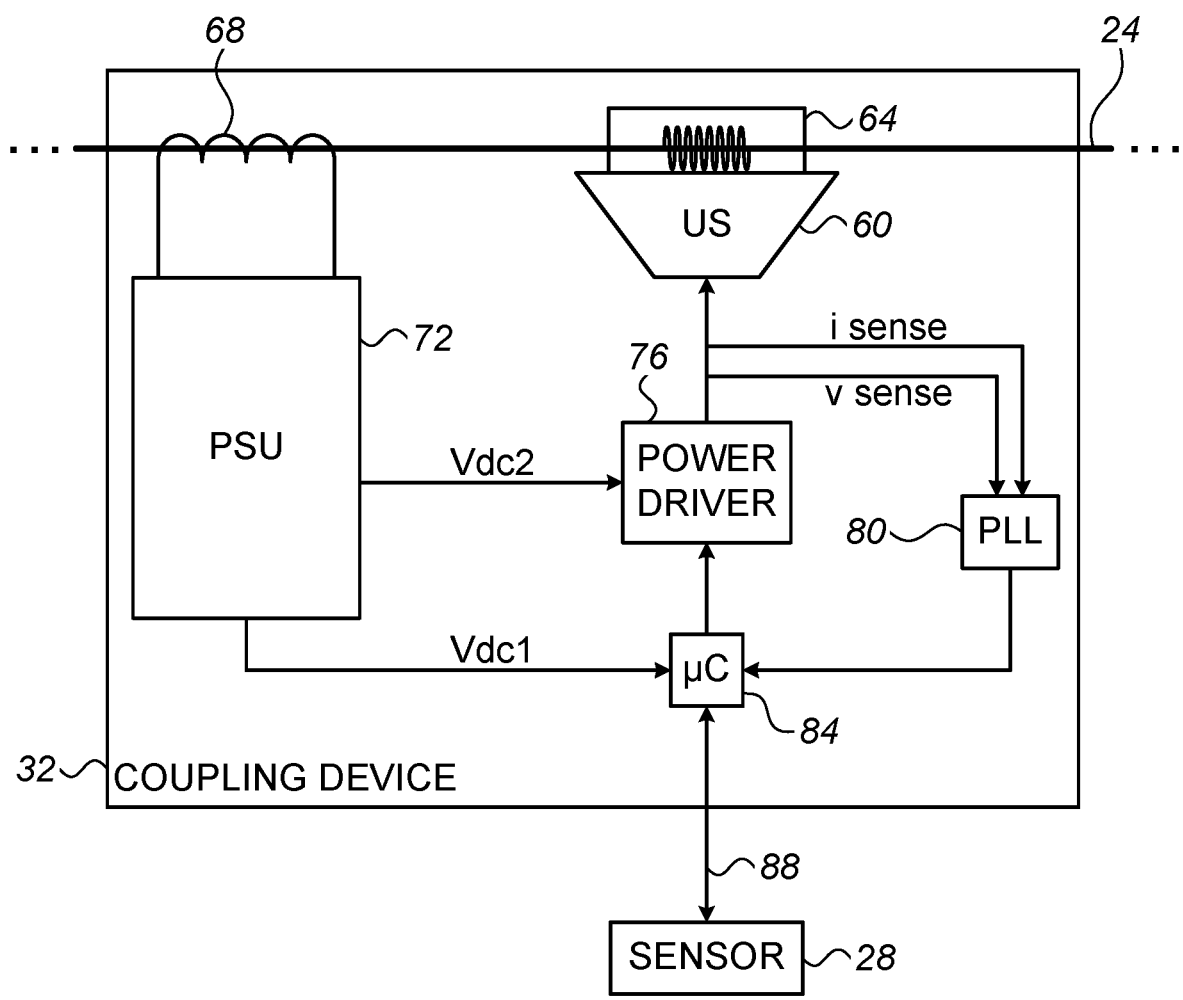
FIG. 2 is a block diagram that schematically illustrates a coupling device, in accordance with an embodiment of the present invention.

Embodiments of the present invention that are described herein provide improved methods, devices and systems for coupling data acquired by one or more sensors onto an optical carrier that traverses an optical cable. The disclosed techniques can be used in a wide variety of systems and applications that involve collecting data from sensors.

In some embodiments, an optical cable serves as a common communication bus for connecting multiple sensors to a control unit. The control unit transmits an optical carrier via the optical cable. Each sensor is coupled to the optical cable via a novel coupling device, which modulates the data acquired by the sensor onto the optical carrier. The control unit demodulates the data that is modulated onto the optical carrier by the various coupling devices of the various sensors. The control unit may forward the demodulated data to a host, or process the data in any suitable way.

In some embodiments, the coupling device comprises an electro-acoustic transducer, a coupler and an electronic circuit. The electronic circuit receives the data from the sensor, converts the data into an electrical signal referred to as a modulating signal (which may be digital or analog), and drives the electro-acoustic transducer with the modulating signal. The electro-acoustic transducer converts the modulating signal into an acoustic wave. The coupler is mechanically attached to the electro-acoustic transducer, and mechanically coupled to a selected section of the optical cable. The coupler applies to the section of the optical cable a time-varying mechanical strain, which varies as a function of the acoustic wave produced by the electro-acoustic transducer. The time-varying mechanical strain applied to the optical cable modulates the phase of the optical carrier. In this manner, the coupling device modulates the data acquired by the sensor onto the optical carrier traversing the optical cable.

As will be explained in detail below, in the disclosed embodiments the mechanical strain applied by the coupler is longitudinal, i.e., substantially parallel with the longitudinal axis of the optical cable. In other words, the coupler typically applies a time-varying stretching force to the section of the optical cable, and in this manner varies the length of the section. The length variations in turn modulate the optical phase of the optical carrier.

It is possible in principle, and possibly simpler, to modulate the optical carrier by applying time-varying transversal strain to the optical cable. Transversal strain modulation (typically time-varying transversal pressure exerted on the cable), however, is inferior to longitudinal strain modulation in terms of conversion efficiency. Longitudinal strain modulation is considerably more efficient in converting the sensor data into optical phase variations. The higher conversion efficiency enables, for example, transmission of the modulated optical signal with a higher Signal-to-Noise Ratio (SNR) and better signal integrity, reduction of demodulation error rate at the control unit, reduction in the power consumption of the coupling devices, and/or support of a larger number of sensors simultaneously. These performance advantages can be translated, for example, into cost reduction and/or general relaxation of system specifications. Moreover, longitudinal strain modulation may outperform transversal modulation in some types of optical cables, which comprise multiple fibers in addition to the optical fiber that carries the optical carrier being modulated.

Furthermore, the coupling device configurations described herein provide significant operational and logistical advantages. For example, the coupling devices can be attached to the optical cable externally, at any desired location, without penetrating the optical cable. In some embodiments the coupler devices can be detached from the cable and possibly re-attached, as desired.

System Description

FIG. 1A is a block diagram that schematically illustrates a sensor system 20, in accordance with an embodiment of the present invention. Systems such as system 20 can be used in any suitable field or application that involves data collection from sensors. Several non-limiting examples include networks of perimeter intrusion detection sensors, transportation-related sensor systems such as along railways, roads or tunnels, energy-related sensor networks such as in power stations, oil rigs or gas fields, and/or geophone sensor networks used in seismology, to name just a few.

System 20 comprises one or more sensors 28 that sense suitable parameters. Sensors 28 may comprise, for example, geophones, microphones, hydrophones, temperature sensors, gas or other chemical detectors, magnetic field sensors, low-rate video cameras, thermal imaging devices, or any other suitable type of sensor. A given sensor 28 may sense any suitable parameter, e.g., vibration, temperature, pressure, humidity, salinity, nuclear radiation, electromagnetic field, motion, space detection, or any other suitable parameter. System 20 may comprise any desired number of sensors, e.g., several dozens, possibly of multiple different types.

System 20 further comprises coupling devices 32 that modulate data, derived from the outputs of sensors 28, onto an optical carrier that traverses an optical cable 24. The structure and functionality of coupling devices 32 are addressed in detail below. In the present example, each coupling device 32 serves a single respective sensor 28. Generally however, a given coupling device 32 serve more than one sensor 28.

Optical cable 24 comprises one or more optical fibers, typically a bundle of multiple fibers. In some embodiments, optical cable 24 further comprises a metallic wire that runs along the cable for providing mechanical strength and support, and/or a metallic shield, e.g., sleeve or braid, which wraps and shields the cable. In some embodiments system 20 uses the wire or shield for supplying electrical power to coupling devices 32 (and possibly also to sensors 28) via electromagnetic induction.

A control unit 36 is coupled to an end of optical cable 24. In the present example control unit 36 comprises an interface 40 for interfacing with optical cable 24, and processing hardware 44 that carries out the various functions of the control unit.

In an example embodiment, hardware 44 comprises (i) a laser source that produces the optical lightwave, (ii) an optical splitter that splits the optical lightwave into a reference beam and an optical carrier which is transmitted (via interface 40) into cable 24, and (iii) an optical receiver that receives the modulated optical carrier from cable 24, recombines the reference and the carrier beams, and demodulates the data carried thereon. This optical configuration may be in the form of, for example, an I/Q homodyne detection scheme that mixes the reference un-modulated optical carrier with two phase-shifted versions of the received modulated optical carrier, and extracts the In-phase (I) and Quadrature (Q) components of the resulting signal. The I and Q components are then used for extracting the optical phase signal.

In some embodiments, hardware 44 further comprises a processor that manages the operation of system 20. The processor may, for example, output the demodulated data to a host and/or perform any other suitable computing or management task.

In some embodiments, hardware 44 further comprises power generation circuitry for driving the electrical conductor running along cable 24 with an Alternating Current (AC)

power signal. As will be explained below, coupling devices 32 may harvest electrical power inductively from this AC power signal.

In the present example, control unit 36 is connected only to one end of cable 24. In this embodiment, the far end of the electrical conductor is grounded. As such, the return path for the AC power signal is earth ground. In this embodiment, interface 40 transmits the un-modulated optical carrier into one optical fiber running in cable 24, and receives the modulated optical carrier from another optical fiber running in cable 24. The two fibers are connected with a suitable loopback connection at the far end of the optical cable. In another embodiment, interface 40 transmits the un-modulated optical carrier into one optical fiber running in cable 24, and receives the modulated optical carrier from the same optical fiber running in cable 24. In this embodiment the fiber is terminated with a mirror at its far end.

FIG. 1B is a block diagram that schematically illustrates a sensor system, in accordance with an alternative embodiment of the present invention. In this embodiment, control unit 36 is connected to both ends of cable 24. Interface 40 transmits the un-modulated optical carrier into one end of a selected optical fiber in cable 24, and receives the modulated optical carrier from the other end of the same optical fiber. In The example of FIG. 1B, both ends of the electrical conductor in cable 24 are connected to control unit 36. The power generation circuitry applies the AC power signal between the two ends.

FIG. 2 is a block diagram that schematically illustrates the internal structure of coupling device 32, in accordance with an embodiment of the present invention. The design shown in FIG. 2 can be used for implementing any of coupler devices 32 in systems 20 and 50 of FIGS. 1A and 1B above.

In the embodiment of FIG. 2, coupling device 32 comprises an electro-acoustic transducer 60, a mechanical coupler 64, and an electronic circuit. In the present example the electronic circuit comprises a power driver 76 (also referred to as a power amplifier—PA), a Phase-Locked Loop (PLL) circuit 80 and a microcontroller (μC) 84. The electronic circuit is connected to sensor 28 using a suitable interface 88. Device 32 further comprises power harvesting circuitry, in the present example comprising a power-harvesting coil 68 and a Power-Supply Unit (PSU) 72.

In some embodiments, microcontroller 84 receives over interface 88 data acquired by sensor 28. Interface 88 may comprise any suitable wired or wireless interface, such as a simple RS232 serial interface, a Universal Serial Bus (USB) connection, a parallel digital interface or bus, a Bluetooth link, or an optical or ultrasonic link, to name just a few examples. In other embodiments sensor 28 produces an analog output, in which case interface 88 comprises an analog interface. In the latter embodiments, microcontroller 84 may digitize the analog output of the sensor so as to produce the data. This implementation is also regarded herein as receiving data from a sensor. In one embodiment, device 32 comprises multiple analog-to-digital converters for digitizing multiple analog outputs of one or more sensors 28, and interface 88 comprises multiple respective analog interfaces.

Power driver 76 converts the data into an electrical signal referred to as a modulation signal, and drives electro-acoustic transducer 60 with the modulating signal. In various embodiments, the modulating signal may be digital or analog. Electro-acoustic transducer 60 receives the modulating signal as input, and converts the modulating signal into an acoustic wave. Put in another way, transducer 60 generates acoustic vibrations as a function of the modulating electrical signal.

Coupler 64 transfers ("couples") the acoustic wave to a selected section of optical cable 24. In the disclosed embodiments, coupler 64 applies to the section of optical cable 24 a time-varying longitudinal mechanical strain, which varies as a function of the acoustic wave produced by transducer 60. The time-varying longitudinal strain thus modulates the data received from sensor 28 onto the optical carrier traversing optical cable 24. Two example configurations of couplers that apply longitudinal strain are illustrated in FIGS. 3 and 4 below.

In the embodiments described herein, electro-acoustic transducer 60 operates at ultrasonic (US) frequencies, i.e., converts the modulating signal into an ultrasonic wave. Generally, however, the disclosed techniques can be implemented using couplers operating in any other acoustic frequency.

Typically, microcontroller 84 modulates the data received from sensor 28 on a carrier having a selected carrier frequency. The modulated carrier is used for driving power driver 76, which in turn drives transducer 60 with a modulating signal derived from this modulated carrier. Transducer 60 generates an acoustic wave that carries the same modulation, and coupler 64 couples this modulation longitudinally to the selected section of cable 24.

In various embodiments, microcontroller 84 may use any suitable analog or digital modulation scheme for modulating the data. The modulation may be binary or of higher complexity. The modulation may modulate the phase, amplitude and/or frequency of the carrier. In example embodiments microcontroller 84 uses 4-level Amplitude-Shift Keying (4-ASK), Binary Phase-Shift Keying (BPSK), Quaternary Phase-Shift Keying (QPSK) or 4-symbol Quadrature-Amplitude Modulation (4-QAM). Alternatively, however, any other suitable modulation scheme can be used. The modulation may comprise Gray coding. In some embodiments microcontroller 84 may encode the data with a suitable Error Correction Code (ECC), and/or a suitable Error Detection Code (EDC) such as a Cyclic Redundancy Check (CRC) code.

The carrier frequency used by microcontroller 84 is typically chosen in the range of frequencies of transducer 60. When using an ultrasonic transducer, for example, the carrier frequency is typically on the order of several tens or several hundreds of KHz.

In some embodiments, different coupling devices 32 in the same system (e.g., system 20 or 50) are assigned different carrier frequencies. Microcontroller 84 of each coupling device 32 modulates the data using its respective assigned carrier frequency. By using different carrier frequencies, each coupling device 32 modulates the optical carrier in cable 24 on a different frequency range. This form of Frequency-Domain Multiple-Access (FDMA) multiplexing enables control unit 36 to de-multiplex and distinguish between the signals of the different coupling devices. In one example embodiment, different devices 32 are assigned carrier frequencies such as 500 KHz, 550 KHz, 600 KHz, etc.

In some embodiments, the carrier frequency is chosen to be at or near the resonance frequency of transducer 60. This choice enables efficient excitation of the transducer, requiring only a relatively low-amplitude modulating signal at the output of power driver 76.

In some embodiments, device 32 comprises a closed-loop mechanism that adjusts the carrier frequency used by microcontroller 84, so as to track the resonance frequency of transducer 60. In the embodiment of FIG. 2, the closed loop is implemented using PLL 80. PLL 80 receives as input the current and voltage levels of the modulating signal produced by driver 76 (denoted "i sense" and "v sense" in the figure).

PLL 80 estimates the relative phase between the current and the voltage, e.g., by mixing the "i sense" and "v sense" signals with one another and low-pass filtering the result. The low-pass filtering produces an estimate of the Direct-Current (DC) component of the current-voltage product. Maximizing the DC component is equivalent to minimizing the phase difference between the current and voltage. It can be shown that a carrier frequency that maximizes the DC component, matches the resonance frequency of transducer 60. Thus, in an embodiment, microcontroller 84 adjusts the carrier frequency adaptively, so as to maximize the DC component produced by PLL 80. Any suitable adaptation scheme, e.g., steepest gradient or various perturbation-based schemes, can be used for this purpose.

In the embodiment of FIG. 2, the electrical power for operating device 32 is harvested from an AC power signal that is applied by control unit 36 to an electrical conductor running along cable 24. In the present example, power-harvesting coil 68 is inductively coupled to the electrical conductor in cable 24. For example, coil 68 may be wound around cable 24. The AC power signal inducts an AC voltage in coil 68.

Power-Supply Unit (PSU) 72 typically rectifies, filters and regulates the AC voltage, and produces two DC voltages denoted Vdc1 and Vdc2. Voltage Vdc1 is used for powering microcontroller 84, and voltage Vdc1 is used for powering driver 76. In one example embodiment, Vdc1=3V and Vdc2=12V, although any other suitable voltages can be used. In an example embodiment, PSU 72 may comprise one or more suitable DC-DC converters.

In alternative embodiments, the electrical power for operating device 32 may be provided by an internal power source. Such a power source may comprise, for example, a battery, a super-capacitor or any other suitable energy source.

In some embodiments, the electrical conductor running along optical cable 24 is used for sending information from control unit 36 to sensors 28 and/or to coupling devices 32. In an example embodiment, control unit 36 modulates this information on the AC power signal that is applied to the electrical conductor. Any suitable analog or digital modulation scheme can be used.

In this embodiment, the electronic circuit in coupling device 32 comprises a receiver that extracts the information from the AC power signal and provides the information to microcontroller 84. Microcontroller 84 processes the received information as appropriate. In some cases the information is processed internally in coupling device 32. In other cases the information is transferred to sensor 28, e.g., over interface 88.

In various embodiments, any suitable type of information may be sent from control unit 36 to devices 32 and/or sensors 28. Example information may comprise configuration instructions to devices 32, e.g., assigned carrier frequencies or on/off commands. Additionally or alternatively, the information may comprise instructions for sensors 28, e.g., camera steering instructions, steering instructions for a motion detection sensor or any other directional sensor, and/or on/off commands. As yet another example, the information may comprise a request to a given sensor or coupling device to provide data (e.g., sensor readout). A given item of information may be addressed to a single recipient (coupling device or sensor) or to a group of recipients.

The system configurations shown in FIGS. 1A and 1B, and the coupling device configuration shown in FIG. 2, are example configurations that are chosen purely for the sake of conceptual clarity. In alternative embodiments, any other suitable system and/or coupling device configurations can be used.

For example, in some embodiments a sensor 28, or multiple sensors 28, are integrated with a respective coupling device 32 to form a single integrative sensing and coupling unit. As another example, in some embodiments, optical cable 24 comprises integral couplers 64 (e.g., the couplers shown in FIGS. 3 and 4 below), which are fitted to cable 24 beforehand and are ready to be attached to the driving circuitry of the coupling device.

In the context of the present patent application and in the claims, power driver 76, microcontroller 84 and PLL 80 are referred to collectively as an "electronic circuit." In alternative embodiments, the functionality of the electronic circuit can be implemented using any other suitable components.

The different elements of coupling device 32 may be implemented using suitable hardware, such as using discrete components, one or more Application-Specific Integrated Circuits (ASICs) or Field-Programmable Gate Arrays (FPGAs), or in any other suitable way. In some embodiments, some elements of coupling device 32 may be implemented using software, or using a combination of hardware and software elements. Elements of coupling device 32 that are not mandatory for understanding of the disclosed techniques have been omitted from the figure for the sake of clarity.

Example Mechanical Coupler Configurations for Applying Longitudinal Strain Modulation FIG. 3 is a schematic side view of a coupler 90 and an electro-acoustic transducer 94, in accordance with an embodiment of the present invention. Coupler 90 and transducer 94 can be used for implementing coupler 64 and transducer 60 of FIG. 2.

Transducer 94 comprises a Piezo-Electric Transducer (PZT), also referred to as a piezo-electric resonator. Transducer 94 may be fabricated from any suitable piezo-electric material, such as, for example, a Lead-Zirconate Titanate PZT material, or a hard piezo-electric material such as C-2 produced by Fuji Ceramics. Alternatively, other materials and/or other types of electro-acoustic transducers can be used.

In an embodiment, transducer 94 comprises a single annular (ring-shaped) transducer element (e.g., resonator) surrounding optical cable 24. Alternatively, transducer 94 may comprise two transducer elements (e.g., resonators), each having the shape of a half-ring. This implementation enables fitting around cable 24 without having to access the end of the cable. Further alternatively, transducer 94 may comprise multiple flat transducer elements (e.g., resonators) that surrounds cable 24, or any other suitable arrangement of one or more transducer elements having similar thickness and piezo-electrical properties.

Coupler 90 comprises a hollow cylinder 98 that also surrounds cable 24. For easy installation around cable 24, Cylinder 98 may be made of two half-cylinders, or even from multiple flat bars. Cylinder 98 may be made of a suitable metal or other rigid material, such as Alumina. Coupler 90 further comprises two brackets 102A and 102B. In one non-limiting example, the length of coupler 90 (and thus the length of the cable section being modulated) is on the order of 20 mm, and the radius of coupler 90 is on the order of 5 mm. Alternatively, however, other suitable dimensions can be used.

Brackets 102A and 102B are clamped firmly to respective ends of a selected section of optical cable 24, such that transducer 94 and cylinder 98 are pressed firmly ("sandwiched") between the two brackets. The section of cable is typically subjected to a suitable initial longitudinal strain (stretching force) before brackets 102A and 102B are tightened.

When driven by a suitable modulating signal (e.g., from driver 76 of FIG. 2), transducer 94 vibrates along the longitudinal axis of cable 24. The axis of vibration is marked with an arrow 106. The vibrations are coupled to cylinder 98, and thus apply a time-varying longitudinal strain to the section of cable 24 between brackets 102A and 102B. The time-varying longitudinal strain is marked with an arrow 110. As a result, the mechanical length (and thus the optical length) of the section between brackets 102A and 102B is modulated as a function of the modulating signal. This modulation in turn modulates the optical phase of the optical carrier traversing cable 24.

FIG. 4 is a schematic side view of a coupler 120 and an electro-acoustic transducer 124, in accordance with an alternative embodiment of the present invention. Coupler 120 and transducer 124 can be used for implementing coupler 64 and transducer 60 of FIG. 2.

Transducer 124 is typically hollow and surrounds cable 24. In the present example, transducer 124 comprises a pair of transducer elements (e.g., resonators) 124A and 124B. Each of the transducer elements may be annular, or it may comprise any of the arrangements of transducer 94 of FIG. 3. The materials mentioned above with regard to transducer 94 ca be used for implementing transducer elements 124A and 124B, as well.

Transducer elements 124A and 124B are attached back-to-back to one another. The two transducer elements are excited in parallel by a modulating signal (e.g., from driver 76 of FIG. 2), denoted $V_1$ in the figure. The polarities of the two transducer elements are oriented so as to have a common ground connection, as seen in the figure. This configuration is sometimes referred to as a Langevin resonator, and is typically characterized by large vibration amplitude due to the back-to-back stacking of the transducers, and the longitudinal dimensions which support resonant standing waves.

Coupler 120 comprises a pair of hollow cylinders 128A and 128B that surround cable 24. As with cylinder 98 of FIG. 3, each of cylinders 128A and 128B may be made of two half-cylinders for easy installation. Cylinders 128A and 128B may be made of a suitable metal or other rigid material. Coupler 90 further comprises two brackets 132A and 132B, similar to brackets 102A and 102B of FIG. 3.

Brackets 132A and 132B are clamped firmly to respective ends of a selected section of optical cable 24, such that transducer 124 and cylinders 128A and 128B are pressed firmly ("sandwiched") between the two brackets. The section of cable is typically subjected to a suitable initial longitudinal strain (stretching force) before the brackets are tightened.

When driven by the modulating signal $V_1$, the back-to-back transducers 124A and 124B vibrate along the longitudinal axis of cable 24. The axis of vibration is marked with an arrow 136. The vibrations are coupled to cylinders 128A and 128B, and thus apply a time-varying longitudinal strain to the section of cable 24 between brackets 132A and 132B. The time-varying longitudinal strain is marked with an arrow 110. As a result, the mechanical length (and thus the optical length) of the section between brackets 132A and 132B is modulated as a function of the modulating signal. This modulation in turn modulates the optical phase of the optical carrier traversing cable 24.

The coupler and transducer configurations shown in FIGS. 3 and 4 are example configurations that are chosen purely for the sake of conceptual clarity. In alternative embodiments, any other suitable configuration can be used. For example, a configuration similar to that of FIG. 4 can be implemented using a single transducer element, or using a stack of more than two transducer elements. Optionally, metallic or other rigid spacers can be used between transducer elements in the stack.

Although the embodiments described herein mainly address sensor networks, the methods and systems described herein can also be used in other applications, such as in low-rate optical communication systems. Several non-limiting examples are agricultural control systems that control agricultural devices such as sprinklers and measure the resulting humidity, communication systems for use in underground mines (in which wireless communication is often not feasible). Yet another example implementation is peripheral defense for ships, in which an optical cable with sensors and coupling devices is installed underwater, around the submerged part of a ship.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   an electronic circuit, configured to receive data to be transmitted over an optical cable, and to convert the data into a modulating signal;
   an electro-acoustic transducer, configured to convert the modulating signal into an acoustic wave; and
   a coupler, which is mechanically coupled to a section of the optical cable, and is configured to apply to the section a longitudinal strain that varies responsively to the acoustic wave, so as to modulate the data onto an optical carrier traversing the optical cable,
   wherein the electronic circuit is configured to generate the modulating signal by modulating the data onto a carrier, whose carrier frequency matches a resonance frequency of the electro-acoustic transducer.

2. The apparatus according to claim 1, wherein the coupler comprises first and second brackets that are fixed to respective ends of the section of the optical cable, and wherein the electro-acoustic transducer is configured to couple the acoustic wave to the brackets, so as to modulate a length of the section.

3. An apparatus, comprising:
an electronic circuit, configured to receive data to be transmitted over an optical cable, and to convert the data into a modulating signal;
an electro-acoustic transducer, configured to convert the modulating signal into an acoustic wave; and
a coupler, which is mechanically coupled to a section of the optical cable, and is configured to apply to the section a longitudinal strain that varies responsively to the acoustic wave, so as to modulate the data onto an optical carrier traversing the optical cable,
wherein the coupler comprises first and second brackets that are fixed to respective ends of the section of the optical cable, wherein the electro-acoustic transducer is configured to couple the acoustic wave to the brackets, so as to modulate a length of the section, and wherein the coupler further comprises one or more cylinders that are fitted between the electro-acoustic transducer and the brackets, for coupling the acoustic wave from the electro-acoustic transducer to the brackets.

4. The apparatus according to claim 1, wherein the electro-acoustic transducer comprises first and second transducer elements stacked back-to-back.

5. The apparatus according to claim 1, wherein the electronic circuit is configured to adaptively adjust the carrier frequency to match the resonance frequency.

6. An apparatus, comprising:
an electronic circuit, configured to receive data to be transmitted over an optical cable, and to convert the data into a modulating signal;
an electro-acoustic transducer, configured to convert the modulating signal into an acoustic wave;
a coupler, which is mechanically coupled to a section of the optical cable, and is configured to apply to the section a longitudinal strain that varies responsively to the acoustic wave, so as to modulate the data onto an optical carrier traversing the optical cable; and
power harvesting circuitry, which is configured to inductively harvest electrical power from an electrical conductor that is part of the optical cable and carries an Alternating-Current (AC) power signal, and to provide the electrical power to the electronic circuit.

7. An apparatus, comprising:
an electronic circuit, configured to receive data to be transmitted over an optical cable, and to convert the data into a modulating signal;
an electro-acoustic transducer, configured to convert the modulating signal into an acoustic wave; and
a coupler, which is mechanically coupled to a section of the optical cable, and is configured to apply to the section a longitudinal strain that varies responsively to the acoustic wave, so as to modulate the data onto an optical carrier traversing the optical cable,
wherein the electronic circuit is configured to inductively receive a signal from an electrical conductor that is part of the optical cable, and to extract information from the received signal.

8. The apparatus according to claim 1, wherein the coupler is configured to be coupled only to an exterior of the optical cable without penetrating the optical cable.

9. The apparatus according to claim 1, wherein the coupler is configured to be detachable from the optical cable.

10. A system, comprising:
a control unit, configured to transmit an optical carrier over an optical cable, to receive a modulated version of the optical carrier from the optical cable, and to extract data from the modulated version; and
one or more coupling devices, each comprising:
an electronic circuit, configured to receive data to be transmitted to the control unit over the optical cable, and to convert the data into a modulating signal;
an electro-acoustic transducer, configured to convert the modulating signal into an acoustic wave; and
a coupler, which is mechanically coupled to a section of the optical cable, and is configured to apply to the section a longitudinal strain that varies responsively to the acoustic wave, so as to modulate the data onto the optical carrier traversing the optical cable, +
wherein the electronic circuit is configured to generate the modulating signal by modulating the data onto a carrier, whose carrier frequency matches a resonance frequency of the electro-acoustic transducer.

11. A method, comprising:
receiving data to be transmitted over an optical cable, and converting the data into a modulating signal;
converting the modulating signal into an acoustic wave using an electro-acoustic transducer; and
using a coupler, which is mechanically coupled to a section of the optical cable, applying to the section a longitudinal strain that varies responsively to the acoustic wave, so as to modulate the data onto an optical carrier traversing the optical cable,
wherein converting the data into the modulating signal comprises generating the modulating signal by modulating the data onto a carrier, whose carrier frequency matches a resonance frequency of the electro-acoustic transducer.

12. The method according to claim 11, wherein the coupler comprises first and second brackets that are fixed to respective ends of the section of the optical cable, and wherein applying the longitudinal strain comprises coupling the acoustic wave to the brackets so as to modulate a length of the section.

13. A method, comprising:
receiving data to be transmitted over an optical cable, and converting the data into a modulating signal;
converting the modulating signal into an acoustic wave using an electro-acoustic transducer; and
using a coupler, which is mechanically coupled to a section of the optical cable, applying to the section a longitudinal strain that varies responsively to the acoustic wave, so as to modulate the data onto an optical carrier traversing the optical cable,
wherein the coupler comprises first and second brackets that are fixed to respective ends of the section of the optical cable, wherein applying the longitudinal strain comprises coupling the acoustic wave to the brackets so as to modulate a length of the section, and wherein the coupler further comprises one or more cylinders that are fitted between the electro-acoustic transducer and the brackets, for coupling the acoustic wave from the electro-acoustic transducer to the brackets.

14. The method according to claim 11, wherein the electro-acoustic transducer comprises first and second transducer elements stacked back-to-back.

15. The method according to claim 11, and comprising adaptively adjusting the carrier frequency to match the resonance frequency.

16. A method, comprising:
receiving data to be transmitted over an optical cable, and converting the data into a modulating signal;
converting the modulating signal into an acoustic wave using an electro-acoustic transducer;

using a coupler, which is mechanically coupled to a section of the optical cable, applying to the section a longitudinal strain that varies responsively to the acoustic wave, so as to modulate the data onto an optical carrier traversing the optical cable; and inductively harvesting electrical power, for powering an electronic circuit that converts the data into the modulating signal, from an electrical conductor that is part of the optical cable and carries an Alternating-Current (AC) power signal.

17. A method, comprising:

receiving data to be transmitted over an optical cable, and converting the data into a modulating signal;

converting the modulating signal into an acoustic wave using an electro-acoustic transducer;

using a coupler, which is mechanically coupled to a section of the optical cable, applying to the section a longitudinal strain that varies responsively to the acoustic wave, so as to modulate the data onto an optical carrier traversing the optical cable; and inductively receiving a signal from an electrical conductor that is part of the optical cable, and extracting information from the received signal.

18. The method according to claim 11, wherein the coupler is configured to be coupled only to an exterior of the optical cable without penetrating the optical cable.

19. The method according to claim 11, wherein the coupler is configured to be detachable from the optical cable.

* * * * *